United States Patent [19]

Ripley, III

[11] 3,944,253

[45] Mar. 16, 1976

[54] INFINITELY VARIABLE TRANSMISSION FOR PEDAL-DRIVEN VEHICLES

[76] Inventor: George Ripley, III, 2811 Country Club Road, Arlington, Tex. 76013

[22] Filed: May 7, 1974

[21] Appl. No.: 467,653

[52] U.S. Cl. .................... 280/238; 74/785; 74/786
[51] Int. Cl.² ......................................... B62M 11/14
[58] Field of Search........... 280/238; 74/750 B, 785, 74/786

[56] References Cited
UNITED STATES PATENTS

| | | | |
|---|---|---|---|
| 1,411,548 | 4/1922 | Yamamoto | 74/750 B |
| 2,731,857 | 1/1956 | Marino | 74/750 B X |
| 3,154,964 | 11/1964 | Lewis | 74/785 X |
| 3,314,308 | 4/1967 | Ziegler | 74/785 |
| 3,456,528 | 7/1969 | Maruyama | 74/785 |
| 3,529,493 | 9/1970 | Egli | 74/785 |
| 3,613,853 | 10/1971 | Linthicum | 74/785 X |
| 3,690,198 | 9/1972 | Huber | 74/785 |
| 3,752,013 | 8/1973 | Cross | 74/785 X |
| 3,766,805 | 10/1973 | Shea | 74/750 B X |
| 3,774,476 | 11/1973 | Sohnlein | 74/785 |

Primary Examiner—Leo Friaglia
Assistant Examiner—Terrance L. Siemens
Attorney, Agent, or Firm—Charles W. McHugh

[57] ABSTRACT

A pedal-operated vehicle including a frame, at least two supporting wheels, a driven wheel hub, and a variable ratio drive system comprising, (in one embodiment) a planetary gear set mounted adjacent and externally of the driven wheel hub. The gear set includes a single sun gear, a single ring gear, and at least one planet gear rotatably mounted on a carrier, with the sun gear being engageable with the wheel hub for driving the same. A foot-operated crank is drivingly connected to the planetary carrier, whereby torque generated by the crank is transferable to the planetary carrier. A rotation controlling means such as a brake is located externally of the ring gear and fixed to the frame for affecting the rotation which the ring gear is permitted to have as the planetary carrier is turned. A hand-operable control unit is used to adjust the brake's effectiveness, whereby the speed of rotation of the sun gear is a function of the rotation which the ring gear is permitted to have. The hand-operable control unit is movable to an infinite number of intermediate positions between its two extreme operating positions, so that there are an infinite number of drive ratios obtainable. As an alternative to the mechanical retarding system, a hydraulic retarding system includes a closed hydraulic loop including a positive displacement pump with an external shaft in contact with the ring gear. A valve in said hydraulic loop can control the amount of liquid circulated through the hydraulic loop, which will affect the rotation of the external shaft, which will in turn affect rotation of the ring gear when torque is applied to the pinion carrier. In another embodiment of the invention, a multi-speed bicycle transmission is adapted to be mounted adjacent the pedal cranks. It includes a single sun gear adapted to be mounted concentrically with the shaft that connects the bicycle's two pedal cranks, with the sun gear rotating alongside the pedal crank hub. The sun gear is rigidly connected to a front chain sprocket.

33 Claims, 15 Drawing Figures

INFINITELY VARIABLE TRANSMISSION FOR PEDAL-DRIVEN VEHICLES

This invention relates to foot-powered vehicle drive systems, and more particularly to an infinitely variable multi-speed transmission for pedal-driven vehicles such as bicycles.

It has been common in the past to provide on certain bicycles the capability of changing the effective ratio between a pedal-driven crank (which constitutes the driving member) and a rear wheel (which constitutes the driven member). Techniques for changing this ratio generally fall into two categories, namely, selective gear engagement and selective sprocket engagement. Those bicycles which utilize various gears that are selectively engaged may be characterized by the so-called three-speed bicycles. A typical three-speed bicycle transmission includes two planetary gear systems, with some commonly used parts (such as a single ring gear) in the two systems; and the driving ratio is changed by means of a cable-actuated rod which acts to position certain elements within a hub such that they are either engaged or idle. While there are many variations of 3-speed transmissions, most of them have been "internal" units that fit within the hub of the driven wheel. Because such internal units are of necessity quite small, their components are typically manufactured to very close tolerances; and, as is the case with most mechanisms, precision in manufacture and criticality in assembly usually results in a relatively expensive product.

The other common multi-speed drive system is usually referred to as a derailleur system; it utilizes a plurality of external sprockets on either the crank or the rear wheel or both. The various sprockets have different numbers of teeth, and a roller chain is caused to engage various combinations of these sprockets in order to achieve different drive ratios. Perhaps the most common of this type of transmission is that employed on a so-called ten-speed bike. A typical 10-speed bicycle utilizes a rear hub with five sprockets affixed thereto, and a pedal-driven crank having two sprockets, thereby providing ten individual driving ratios to the rear wheel. Similarly, a 15-speed bike will usually have a rear hub with five sprockets and a pedal crank with three sprockets. When it is desired to change from one speed to another, it is necessary to manually change the position of at least one lever which "derails" the chain from one set of sprockets to another set.

It has been recognized that both of the above-described transmission systems have certain disadvantages. For example, the 3-speed planetary hub has relatively large increments between its three fixed speed ratios; of course, encompassing a wide range with only three specific ratios naturally increases the gap between the respective ratios. Also, the adjustment of the cable-actuating mechanism is sometimes deemed to be rather difficult. One reason for the difficulty in adjustment can perhaps be understood when it is realized that there will typically be over 50 individual parts and subassemblies which fit into a 3-speed hub, including, for example: a brake plate, a brake band, a low gear pawl, a high gear pawl, a planetary cage, a ring gear, several pinions and spindles, three or more sets of ball bearings, several sleeves, spacing washers, locking clips, lockwashers, keys, thrust rings, couplings, nuts, pins, ratchets, snap rings, an axle, set screws, springs, a push rod, etc.

Still another deficiency of many multi-speed bicycles has been their inability to accommodate the mechanisms used to achieve the various drive ratios and also accommodate a simple and reliable coaster brake. Hence, most multi-speed bicycles have incorporated external brake pads that bear against a tire rim to accomplish braking; activation of such brakes is typically accomplished by pulling on a lever mounted somewhere on the handlebars, which lever is connected through cables to a linkage and the brake pads. Of course, since the brake pads are externally mounted, they are exposed to rain and the like, and their efficiency is not always consistent.

In one attempt to avoid the difficulties with the prior art, at least one bicycle has been proposed with the object of moving smoothly through an infinitely variable number of drive ratios, thus avoiding the specific three-and ten-speed ratios that are built into prior transmissions. That bicycle is disclosed in U.S. Pat. No. 3,769,849 to Hagen. It appears, however, that to utilize such a Hagen drive system would require the use of a special frame built to accommodate that particular system; hence it would apparently be awkward to modify a conventional frame to receive a Hagen system.

Still another drive system has been disclosed in U.S. Pat. No. 3,766,805 to Shea. Like many other 3-speed transmissions, it may be characterized as being of the planetary type; but it differs from prior systems having two sets of pinion gears by providing three sets of pinion gears, three sun gears, and three ring gears.

If simplicity and a relatively small number of internal parts are goals to be espoused, it would seem that there is still room for improvement in bicycle transmissions. Accordingly, it is an object of this invention to provide the advantage of a multi-speed transmission while doing so in a truly simplified manner.

Another object is to provide a bicycle transmission which can be readily attached to existing bicycles so that it can be sold as a replacement or conversion kit.

Still another object is to provide a multi-speed transmission which can automatically shift from one speed ratio to another as operating conditions change.

one more object is to provide a multi-speed transmission which employs relatively few parts and which is characterized by reliability and ease of adjustment.

Still another object is to provide a multi-speed bicycle transmission which can be employed in conjunction with coaster brakes.

An additional object is to provide a transmission which could be used to modify existing 1-speed, 3-speed, 10-speed, or 15-speed bicycles to provide an infinite number of drive ratios between the pedal crank and the driven wheel.

These and other objects are met by providing an "exteriorly mounted" planetary gear transmission, including: a single sun gear which is drivingly engaged with a wheel which is to be driven; a single ring gear rotatably mounted on the frame; and a pinion carrier which is connected to a foot pedal through a chain and two sprockets. At least one, and typically three, pinion gears are provided; those pinions in excess of one will be included for dynamic balancing and the like —not for any different function. A plurality of drive ratios are achieved by controlling, through mechanical or hydraulic means, the amount of slippage with respect to the frame which the ring gear is permitted to have. If the ring gear has essentially full slippage (i.e., it turns as a unit together with the pinion carrier and pinions), the pinion gears do not rotate about their spindles, and the pinion carrier directly drives the sun gear through the pinion gears; the drive ratio is therefore 1:1 (when the front and rear sprockets are the same size). Thus, one full turn of a bicycle's front (or pedal) sprocket will produce one full turn of the driven wheel. In comparison to other drive ratios that are obtainable, a ratio of 1:1 would typically be categorized as "low"; but, as will be explained hereinafter, the ratio of 1:1 is not the lowest ratio that is obtainable with this particular transmission.

If the ring gear is locked to the frame, e.g., through application of a friction member connected to a control lever, the pinion gears will travel around the static ring gear as well as rotate about their spindles; the drive ratio is given by the formula $T_R/T_S + 1$, where $T_R$ is the number of teeth in the ring gear, and $T_S$ is the number of teeth in the sun gear. Alternatively, the pitch diameters of the ring and sun gears may be used instead of the respective number of teeth; the result of the calculation will be the same. A typical value for this "high" drive ratio on an adult-size bicycle would be about 4:1. Thus, one full turn of the pedal sprocket would provide four full turns of the driven wheel. For comparison purposes, it will perhaps be worthwhile to note that conventional 10-speed bicycles have a range of drive ratios between approximately 1.3:1 to 3.7:1. Hence, the instant transmission can easily be built to encompass the range of drive ratios found in more complicated and more expensive transmissions; but, with this transmission, the change from a high to a low gear ratio (or vice versa) is accomplished smoothly with no finite increments between the highest and lowest ratios. In other words, there are truly an infinite number of ratios available to the operator between "high" and "low", all of which are achieved by permitting the single ring gear to have more or less controlled rotation (slippage).

A mechanical system for retarding the ring gear may comprise an arcuate band which surrounds a substantial portion of the periphery of the ring gear, so that the friction band may affect rotation of the ring gear in accordance with the amount of tension in a control cable leading to the band. Alternatively, an internal brake shoe may be utilized instead of an external brake band. With a hydraulic system, a positive displacement pump (such as a gear driven pump) is engaged with the outer surface of the ring gear, and a closed hydraulic loop contains a liquid which is circulated by the positive displacement pump. By regulating certain valves in the hydraulic loop, the positive displacement pump can be made to inhibit rotation of the ring gear. If a pressure regulating valve is included in one parallel leg of the hydraulic loop, an automatic change in drive ratio can be achieved without any additional manual control by the vehicle operator.

Figure 1:
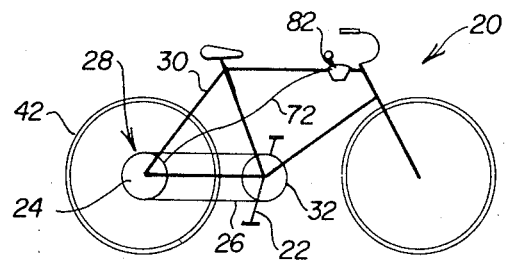
FIG. 1 is a schematic side elevational view of a pedaled vehicle.

With initial reference to FIG. 1, a bicycle 20 is shown with a pedal crank 22, through which a rear sprocket 24 is adapted to be driven with a chain 26. The single sprocket 24 is rigidly connected to a part of the transmission 28, and may be considered to be the "driving" member of the unit. A transmission 28 may be mounted on a bicycle frame 30 in a location adjacent the rear wheel as shown in FIG. 1, or a location indicated by the front sprocket 32. The most likely location for installation of the transmission 28 is at the rear, so such an embodiment will be described first.

Figure 2:
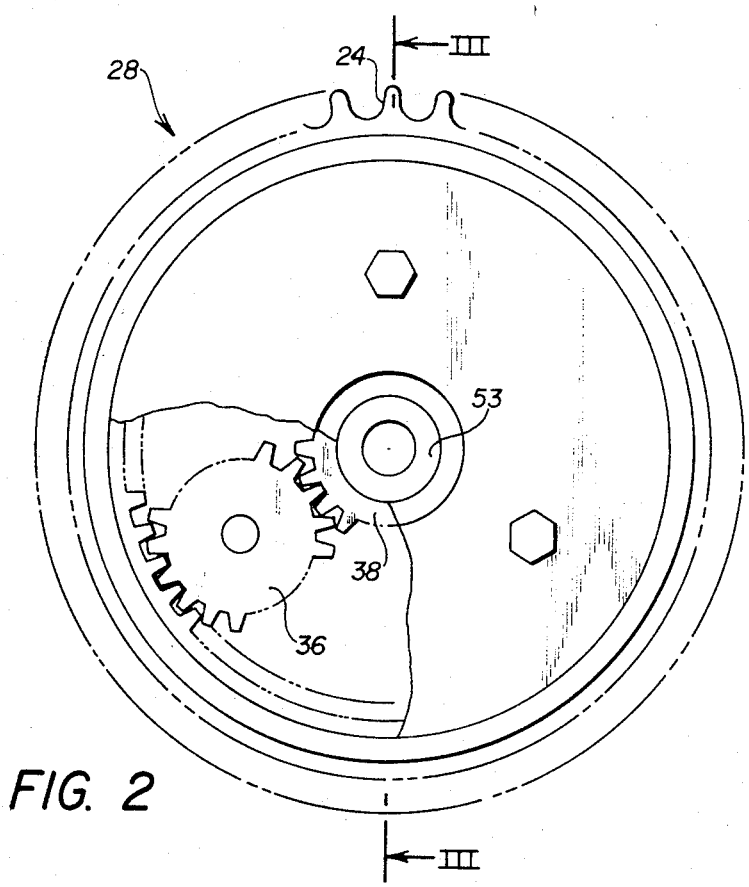
FIG. 2 is a side elevational view, partially broken away, showing the planetary transmission housing.
Figure 3:
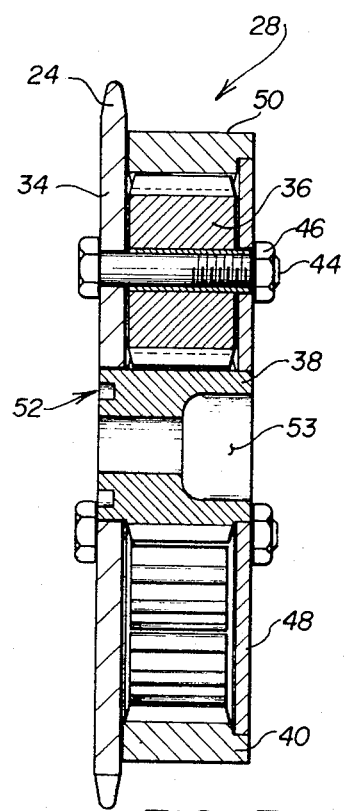
FIG. 3 is a cross-sectional veiw thereof taken in the plane III—III.

Referring next to FIGS. 2 and 3, one embodiment of the transmission 28 is shown, without a "mechanical" brake band affixed thereto. The transmission 28 includes an inside cover plate 34, which may be combined with the rear sprocket 24 as a single piece. Rotatably attached to the cover plate 34 are preferably three pinion gears 36. Only a single pinion gear 36 is functionally required, but at least two such gears foster balancing of the torque loads, as well as improving the overall balance of the transmission. The single pinion gear 36 (which is essential), or the multiple pinion gears (which are optionally provided), are adapted to mesh at all times with a sun gear 38 and the interior of an internally toothed ring gear 40. The ring gear 40 is rotatably mounted on the frame 30 at a location such that it is exterior of, i.e., it lies alongside, the driven rear wheel 42. Of course, it will be recognized that the inside cover plate 34 is functionally equivalent to what is frequently called a "carrier" in a planetary transmission, and that name will also be used herein.

The pinion gear (or gears) 36 are rotatably mounted to the carrier plate 34 by bolts 44 which have a suitable cylindrical bearing surface. Nuts 46 threadably engage the bolts 44 and hold an outside cover plate 48 securely to the inside plate 34. The cover plates 34, 48 securely hold the gears together as an assembly, and also serve to exclude any dirt or other contaminants which could interfere with smooth gear operation. Too, as is clearly shown in FIG. 3, the ring gear 40 is mounted between the carrier 34 and the cover plate 48—where it rides or "floats" with respect to other parts of the transmission. That is, the ring gear 40 is not rigidly supported (through bearings and the like) to the frame 30, as is the sun gear 38.

Figure 4:
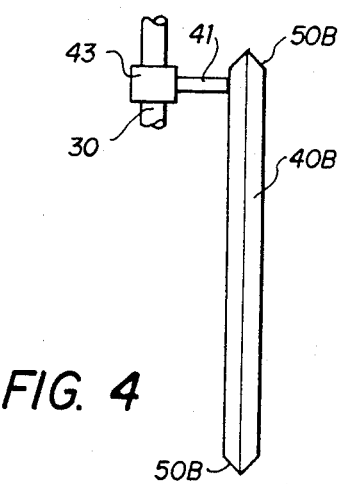
FIG. 4 is a schematic edge view of an internally toothed ring gear, showing an external member for rubbing against a serrated surface of a gear.

The peripheral surface of ring gear 40 is adapted to be selectively braked so that the gear's rotation with respect to the frame 30 may be controlled. The configuration for peripheral surface 50 may be cylindrical as shown in FIG. 3, or it may be arched as shown in FIG. 4, or it may even have some other configuration which is compatible with a brake band which is to be mounted therearound. The peripheral surface 50B shown in FIG. 4 naturally has a greater surface area than the cylindrical surface 50 in FIG. 3; such an arched surface may be preferred when braking effectiveness is to be optimized.

Figure 5:
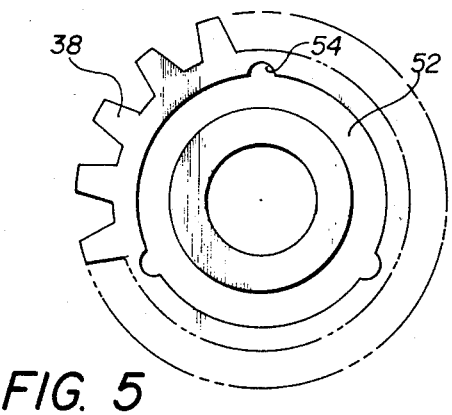
FIG. 5 is a plan view of the transmission hub of FIG. 2.

Referring once again to FIG. 3 and also to FIG. 5, the sun gear 38 has an annular groove 52 on its interior side, which groove is adapted to receive a conventional "driver" for a coaster brake. Spaced recesses 54 accommodate locking pins (not shown) such that the sun gear 38 will rotate with the driver as a unit, but the two may be readily separated for maintenance and the like. The sun gear 38 also may advantageously be counterbored (as at 53) to accommodate a bearing for the axle of the driven wheel (not shown). A typical sun gear 38 might have the following specifications: diametral pitch 12; pitch diameter 2.0 in.; pressure angle 20°; addendum 0.0667 inch; and dedendum 0.0833 inch.

Figure 6:
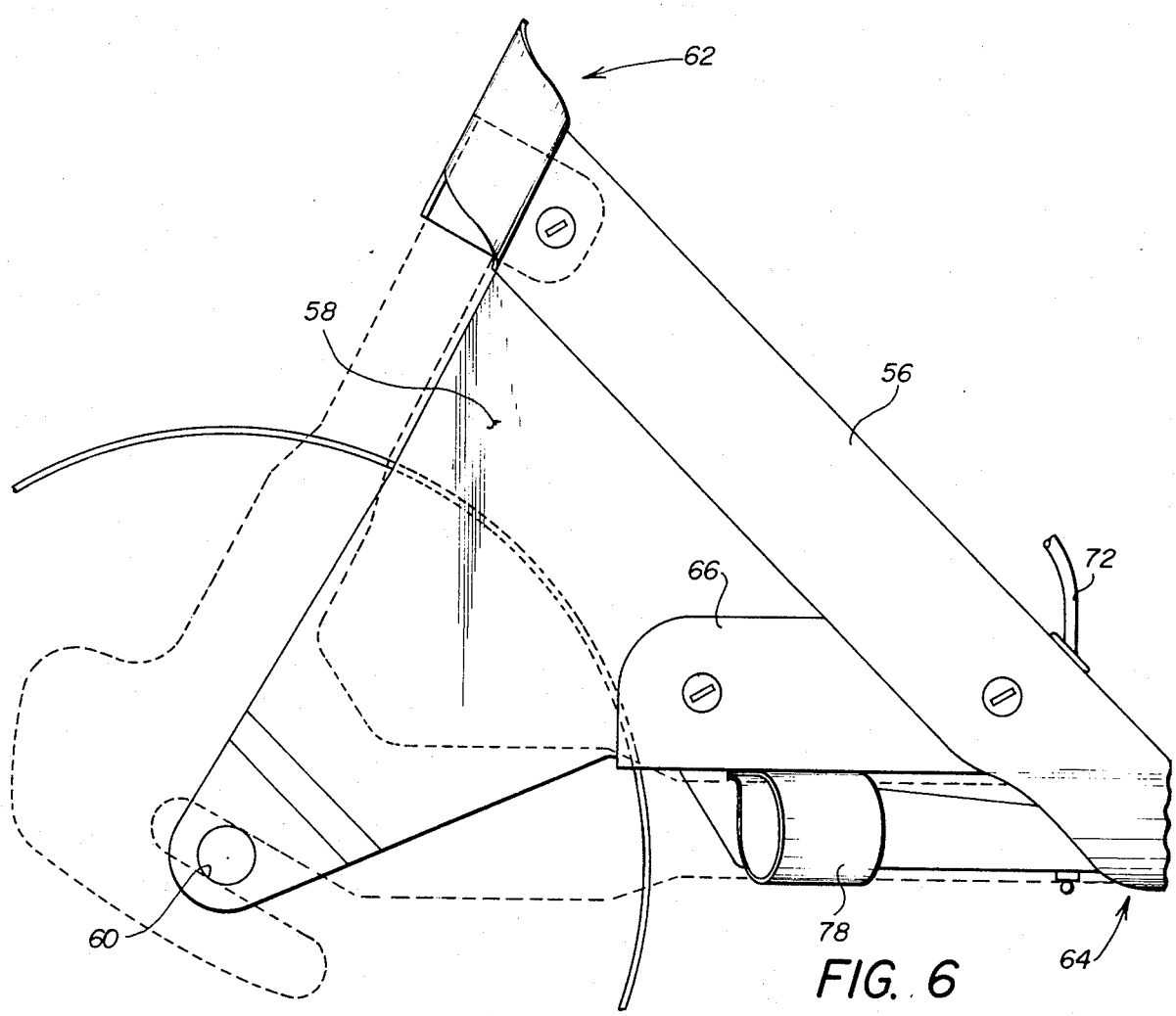
FIGS. 6, 7, 8 and 9 are various views of a mechanical braking means for retarding the ring gear.
Figure 7:
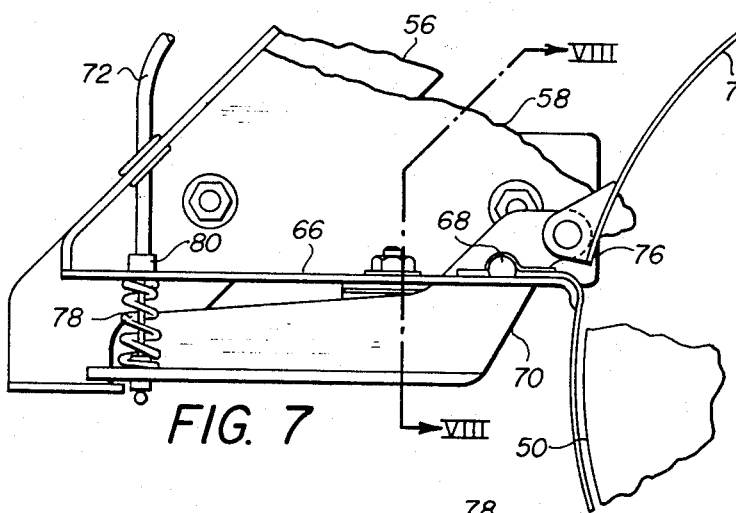
Figure 8:
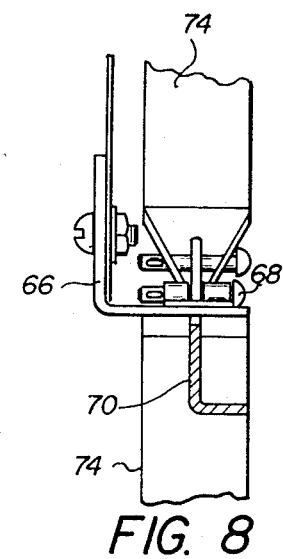

Referring next to FIGS. 6 and 7 (which are right and left side elevation views), a structure is provided by which a brake band may be mounted with respect to the frame 30 to effect controlled rotation of the ring gear 40. The bracket structure includes a brace 56 affixed to a structural plate 58, said plate having an aperture 60 through which the rear axle (not shown) would protrude. At the respective ends of the brace 56 are cylindrical clamps 62, 64 which are adapted to envelope and clamp down on a respective section of the tubular frame 30. As may perhaps best be seen in FIGS. 7 and 8, attached to the plate 58 is a structural element 66 in the form of a somewhat short piece of angle iron or the like. The element 66 serves as a rigid foundation for the fulcrum rod 68 of the brake lever arm 70. At a first end of the lever arm 70, one end of a wire cable 72 is connected, which cable may be of the same type of construction as is common with cables used in connection with caliper brakes on bicycles. The other end of cable 72 is connected, of course, to a hand-operable control unit 82 (FIG. 1) which is mounted at a convenient location on the frame 30. At the other end of the lever arm 70 is pivotally connected the floating end of a brake band 74. As can be seen in FIG. 7, pulling upward on the cable 72 will cause lever arm 70 to rotate clockwise, thereby pulling the two ends of brake band 74 together, such that the band will exert a dragging force on the peripheral surface 50 of ring gear 40. A spring 78 normally biases the front end of the lever arm 70 downward and the rear end upward, such that the brake band 74 is expanded toward a non-drag position. The required excursion of the floating end 76 toward the fixed end of the brake band 74 would normally be rather slight, i.e., on the order of 0.010 inch. That is, there need be only about 0.010 inch movement of end 76 between a condition of free rotation of the ring gear 40 and a condition of the ring gear being locked against rotation with respect to the frame 30.

Figure 9:
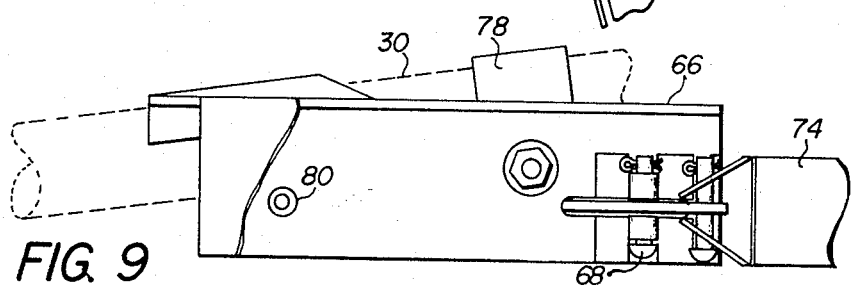

FIG. 9 is a different view of a portion of the structural means which may be employed to accomplish selective retarding of the ring gear 40. The clamp 78 holds the angled piece 66 securely to a horizontal piece of the frame 30, and thus fixes one end of the brake band 74 rigidly to the frame. Although not shown in this particular figure, the hand-operated cable 72 passes through collar 80 where it then is connected to brake lever arm 70.

An alternate embodiment of a means for selectively retarding the ring gear comprises what will be categorized as a hydraulic means. Referring next to schematic FIG. 10, a closed hydraulic loop 100 includes a positive displacement pump 102 which is structurally coupled to the ring gear 40A, as by a pinion 104 which is mounted on a shaft at a location where it engages external teeth on the gear 40A. Imparting torque to the pinion carrier 34 by pedaling the bicycle will tend to rotate the pinions and the ring gear 40A as a unit. The external pinion 104 will thus be driven by the rotating ring gear 40A, such that the positive displacement pump will circulate a liquid through the closed loop 100. This condition might persist indefinitely except for the fact that an adjustable flow regulating valve 106 is provided within the hydraulic loop between the pump 102 and a resevoir 122. A hand-operable lever 110 is adapted to be affixed to the bicycle frame at a conveniently reached location, such that it may be readily moved during operation of the bicycle in order to position a piston 112 within valve 106. Depending upon the positioning of the piston 112, the flow of liquid through flow control valve 106 will be large or small, and the pressure in the loop 100 ahead of valve 106 will be low or high. If the piston 112 were to be moved to a position such that flow through valve 106 was completely inhibited, the pump 102 would be stalled and pinion 104 would stop, thereby inhibiting further rotation of the ring gear 40A. This would be the same result as that achieved with the mechanical embodiment of FIG. 7 when the brake band 70 is closed so tightly about peripheral surface 50 that it cannot rotate. Valve 106 could, of course, be open slightly to permit modulated flow of liquid through the loop 100, and thus controlled rotation of ring gear 40A. When the gear 40A is locked to the frame, the ratio between the driving pedal crank and the driven rear wheel will be the "design" ratio, e.g., 1 to 4, although this is traditionally expressed as a 4 to 1 ratio. This would probably be considered to be a high performance ratio, which should be popular with young persons because of the rapid acceleration it would permit—assuming a nearly unlimited source of physical energy. Older persons might well prefer valve 106 to be opened considerably, which would permit the ring gear to slip and make the pedalling task much easier. For any given setting of the valve 106 through crank 110, the torque to the driven wheel will increase as the work expended through pedalling increases.

When a person first begins to ride a bicycle having a planetary transmission of the invention thereon, he may not be able to sense through his pedalling effort whether or not the ring gear is stationary—assuming that he wants to set the controls so that it is stationary. Accordingly, an optional accessory is provided in the form of a resilient flapper 41 that may be pendantly attached to the frame 30 and adapted to rub against an exposed side of the ring gear. (See FIG. 4.) Serrations or the like on the surface of the gear which is rubbed can cause vibrations in the flapper, the frequency of which will be a function of the speed of rotation of the ring gear. Naturally, if no noise is being generated by the flapper, the ring gear is static with respect to the frame. Turning the clamp 43 with respect to the frame 30 can selectively increase or decrease the magnitude of any noise generated by the flapper 41.

Figure 10:
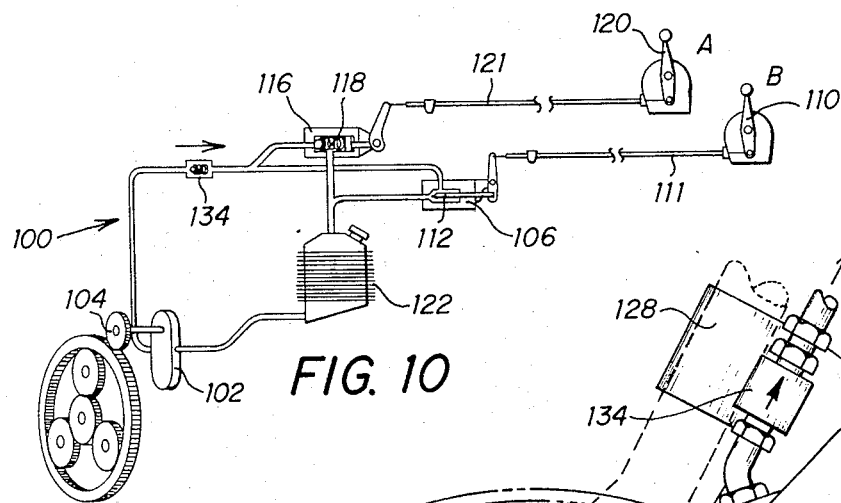
FIG. 10 is a schematic hydraulic system for use in restraining the ring gear of the planetary gear set.

An alternate (or additional) flow control means is shown schematically in FIG. 10 in a parallel leg of the hydraulic loop in which pressure regulating valve 116 is provided. Such a valve 116 is adjustable like valve 106 through hand control lever 120 and cable 121; for a given setting, the valve provides a constant torque to the driven wheel—for the reason that its pressure relief function prevents an unwanted amount of pressure building up in the loop 100. That is, by backing off an appropriate amount on lever 120, there is established in loop 100 any desired fluid pressure to which the loop will build as torque is applied to the pinion carrier; this pressure may be referred to as a desired torque pressure, i.e., a pressure resulting from the applied torque. Since a constant torque is available with a pressure regulating valve 116, a hydraulic transmission utilizing such a valve should find favor with physicians (particularly those who specialize in heart problems) who would like their patients to exercise—but not too strenuously. If a bicycle rider were to attempt to pedal too hard, any increase in pressure immediately downstream of the pump 102 would be relieved by the valve 116; more fluid would be pumped through the loop 100, but the rider would feel no increased resistance to overcome—after he had reached the plateau established by lever 120. As another illustration, let it be assumed that a cyclist is traveling at, say, 10 mph on level ground, and valve 116 is set so that it just holds the ring gear stationary. If he encounters an upward slope, he will continue to pedal as before, but his bicycle will slow down. This is because the same amount of torque is available through his constant pedalling, but the torque requirement is increased at the rear wheel. Ring gear 40A will then begin to rotate (clockwise in FIG. 10) at a speed dictated by the torque requirement to propel the bicycle. Rotation of the ring gear 40A would normally rotate pinion gear 104, thereby driving the pump 102, which would naturally tend to increase the pressure in loop 100. Valve 116 prevents such an increase in pressure by opening slightly to permit flow of liquid in the loop 100. The circulation of liquid in loop 100 will be such that ring gear 40A can rotate by an amount necessary to provide the mechanical advantage required to drive the rear wheel. For a two-wheel bicycle, the rate of forward progress up the hill may become so slow as to make balancing awkward, and the cyclist can either compress spring 118 (thereby increasing the pressure in loop 100, causing him to work harder) or simply get off the bicycle and walk. With a three-or four-wheel cycle (where balancing on the vehicle is no problem), for a given setting of valve 116 the cycle will merely slow down until the rate of progress up the hill corresponds to the work performed by the cyclist. This may mean that the cycle slows to 8, 6, or even 1 mph, which is slower than normal walking speed. When the cyclist reaches level ground again, his vehicle will automatically speed up while he is pedalling at the same constant rate. If he encounters a downward slope, he can coast down the hill in the same manner of conventional bicycles. A typical embodiment of valve 116 would include a spring which would permit the build up of, say, 200 psi in loop 100 when the spring is fully compressed; 100 psi when one-half compressed; and no pressure when the valve is fully open.

If a hydraulic embodiment is provided in which both a flow control valve 106 and a pressure regulating valve 116 are included, it will be necessary to properly adjust one in order to obtain the full benefit of the other. Thus, if flow control valve 106 is to be employed to adjust the speed ratio from time to time, then valve 116 should be set to its highest pressure setting by fully pressing the spring 118 through rearward movement of handle 120. Likewise, if pressure regulating valve 116 is to be relied on for its characteristic advantages, then valve 106 should be fully closed. If both valves 106 and 116 are kept fully closed, then the ring gear will be locked and only one speed ratio is obtained.

Since the two valves 106, 116 are capable of independent operation, it would be entirely feasible to incorporate on a pedal-driven vehicle only one of the valves. If it was desired to make possible the later addition of the other valve, T-fittings could be put in the lines and appropriate plugs would be placed in the unused openings of the T-fittings to block them until they were needed.

An appropriate location for the reservoir 122 on a bicycle is immediately below the seat and protected within the frame. The reservoir 122 will typically be vented to the atmosphere, and it will likely hold something on the order of one-half pint of liquid such as automobile brake fluid, transmission fluid, light weight oil, etc. The tank may advantageously have external cooling fins to help dissipate any heat which may be generated due to pump operation.

Figure 11:
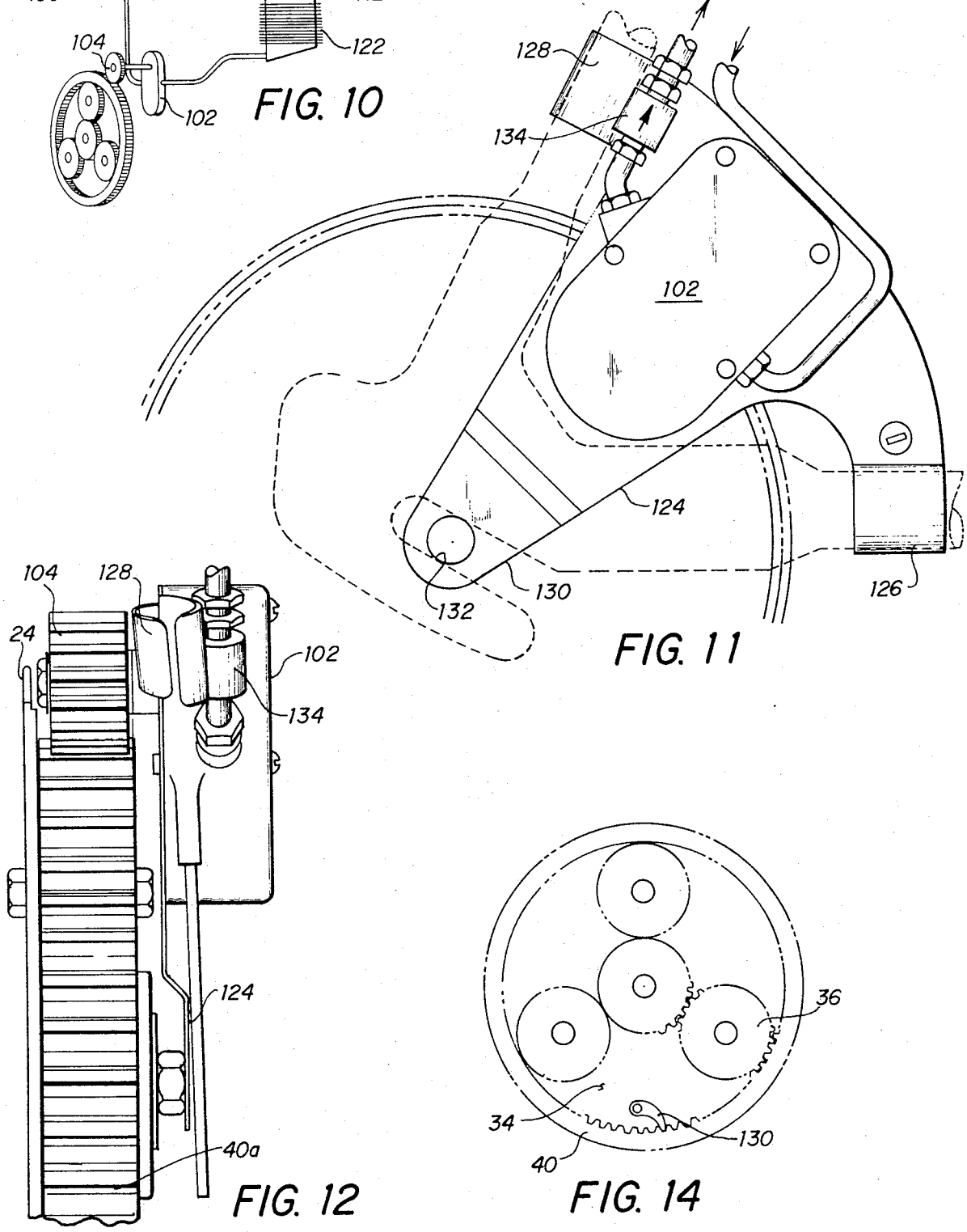
FIGS. 11 and 12 are two views of a pump for mounting on the vehicle adjacent a rear wheel.
Figure 12:
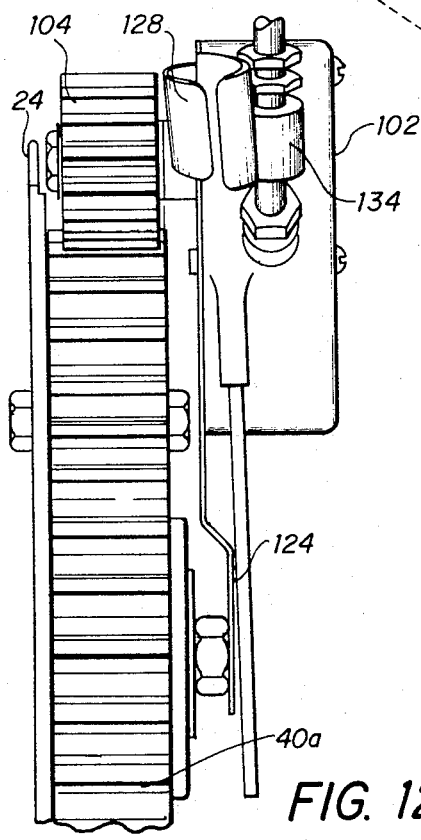

As seen in FIGS. 11 and 12, an appropriate mounting location for the hydraulic pump 102 is on a bracket 124 which is rigidly held to the frame 30 by tubular clamps 126, 128 as well as tab 130 which has an aperture 132 that encompasses the rear wheel axle. A check valve 134 is advantageously provided in the discharge line from the pump 102, to prohibit the ring gear from turning in the reverse direction (which it may have a tendency to do during the application of a coaster brake).

Figure 13:
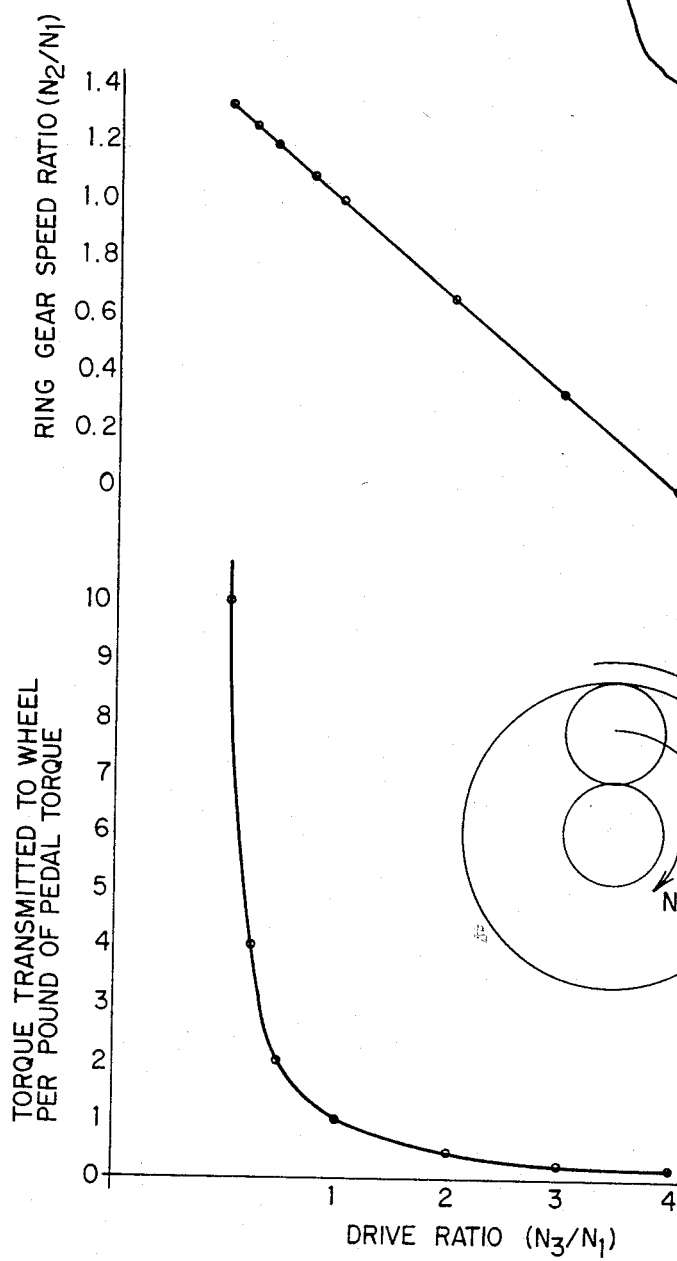
FIG. 13 is a performance curve for the transmission of the invention.

In operation of the multi-speed transmission disclosed herein, a certain maximum or design ratio will have been built into the transmission by virtue of selection of the gear sizes. This can easily be established at, say, 4 to 1. In operation, this design ratio is achieved by locking the ring gear to the frame while the sprocket is being turned. Permitting the ring gear to rotate with respect to the frame will reduce the achieved drive ratio (number of revolutions of sun gear divided by number of revolutions of carrier), but it will increase the driving torque to the wheel per pound of applied pedal torque. This is illustrated in the performance curve of FIG. 13.

Figure 14:
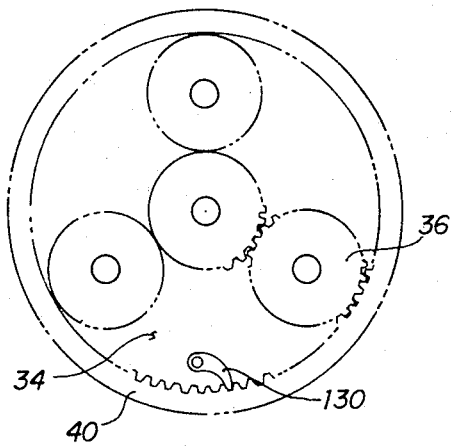
FIG. 14 is a schematic elevational view showing the ring gear and a pawl.
Figure 15:
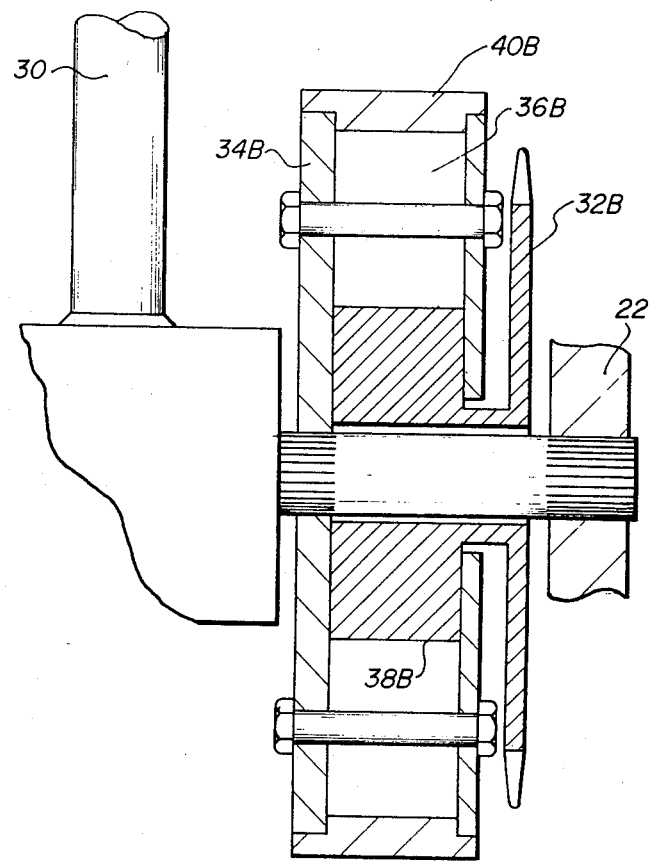
FIG. 15 is an alternate embodiment of the invention wherein the transmission is installed on a bicycle frame between the two pedal cranks.

With regard to a "mechanical" embodiment of the transmission, wherein a brake means [a band, pad(s), shoe(s) or the like] is used to control ring gear rotation, and wherein a coaster brake is employed, it may be desirable to incorporate a rachet mechanism for the purpose of precluding reverse relative motions of the ring gear with respect to the pinion carrier. Referring to FIG. 14, a pawl 130 is mounted on the pinion carrier 34 in such a way that it permits rotation of the ring gear counter-clockwise with respect to the carrier, but precludes clockwise rotation (with respect to the carrier). The effect of this is to lock the ring gear to the carrier upon back-pedalling; this more nearly insures that the cycle can be quickly started from a rest position—even if the hand control is not optimally adjusted. The pawl 130 also insures that there will be positive activation of a coaster brake, regardless of the adjustment of any hand control.

In lieu of mounting the pawl 130 on the pinion carrier, it would be possible to mount a pawl on the frame 30 in much the same manner that the resilient flapper is shown in FIG. 4. In fact, a rigid, spring-loaded pawl would serve the same purpose as the aforementioned flapper, as far as providing an audible signal to the cyclist concerning the operation of his transmission. A frame-mounted pawl would preclude reverse rotation of the ring gear with respect to the frame, but it would not preclude rotation—in either direction—of the pinion carrier with respect to the ring gear. Thus, such an arrangement would not eliminate the high torque values which are available at drive ratios of less than 1:1. (For a review of those high values, see FIG. 13.) In practice, a stable vehicle with three or more wheels which incorporates the frame-mounted pawl can be driven up a steep hill at essentially a snail's pace, while the operator works at the same rate that he does while speeding along level ground.

In still another embodiment of the invention, a bicycle transmission could be adapted for installation on a conventional frame at the forward location where a pedal crank is traditionally mounted. In such an embodiment, the pedal crank (or its axle) is keyed to the pinion carrier so that they turn together. The sun gear floats over the crank axle and is affixed to the front sprocket. A chain or the like would then connect the front sprocket to the rear sprocket, as is common with a conventional one-speed bicycle. As before, a braking means as disclosed herein is provided to selectively control the rotation of the externally mounted ring gear with respect to the frame. It will be recognized that such an embodiment would permit relatively easy modification of a one-speed bicycle into a multi-speed bicycle.

While only the preferred embodiments of the invention have been disclosed in great detail herein, it will be apparent to those skilled in the art that modifications thereof can be made without departing from the spirit of the invention. Thus, the specific structure shown herein is intended to be exemplary and is not meant to be limiting, except as described in the claims appended hereto.

What is claimed is:

1. A pedal-driven vehicle including a frame and at least one driven wheel, and a variable-speed transmission including a planetary gear set, comprising:
    a. a single sun gear which is drivingly connectable to the wheel which is to be driven;
    b. an internally toothed ring gear rotatably mounted with respect to the frame at a location such that it is exterior of the driven wheel;
    c. at least two pinion gears adapted to mesh at all times with the sun and ring gears;
    d. a carrier upon which the pinion gears are rotatably mounted;
    e. a cover plate which is coaxial with and spaced from the carrier by a distance slightly greater than the thickness of the pinion gears, and said cover plate being secured such that the pinion gears are retained between the carrier and the cover plate, and said ring gear being floatingly mounted with respect to the frame between the carrier and the cover plate;
    f. means for transferring torque from at least one pedal to the carrier, whereby an operator acting on the pedal can impart torque to the carrier so as to cause it to rotate; and
    g. manually operable control means for regulating the amount of rotation which the ring gear is permitted to have with respect to the frame, such that the speed of rotation of the sun gear and hence the rotational speed of the driven wheel can be affected by controlling the slippage of the ring gear as torque is applied to the carrier, and said slippage being adjustable through a plurality of step-less increments beginning with zero slippage.

2. The pedal-driven vehicle as claimed in claim 1 wherein the control means for regulating the rotation of the ring gear comprises a mechanical system which includes a cable extending between a hand-operable control unit and a brake means which is adapted to frictionally engage the periphery of the ring gear.

3. The pedal-driven vehicle as claimed in claim 1 wherein the control means comprises a hydraulic system including a positive displacement hydraulic pump in a closed loop, which pump is structurally coupled to the ring gear, and further including an adjustable flow restrictor in the closed hydraulic loop, whereby restricting the flow of hydraulic fluid in the loop can slow the pump which in turn will slow rotation of the ring gear.

4. An apparatus for providing a plurality of drive ratios between a pedal crank and a driven wheel on a pedal-driven vehicle, said apparatus being adapted to be mounted externally of a wheel hub, comprising:
    a. a sprocket adapted to be driven by a chain connected with a pedal crank, and said sprocket having mounted for rotation therewith at least one stub axle upon which a planetary pinion is mounted, such that the sprocket functions as the carrier in a transmission of the planetary type;
    b. an internally toothed ring gear mounted for rotation with respect to the vehicle frame, said gear having a peripheral surface whose configuration is adapted to engage a retarding means mounted on the frame, which retarding means is adapted to selectively retard rotation of the ring gear in stepless increments, and said ring gear meshing at all times with the planetary pinion;
    c. a sun gear adapted to be mounted concentrically with the driven wheel's axle and to mesh with the planetary pinion, said sun gear having means for driving engagement with the wheel to be driven; and
    d. a hand-operated control means adapted to operate through the retarding means to selectively retard rotation of the ring gear, whereby torque transferred from the pedal to the sprocket is imparted to the wheel in a manner determined by the relative rotation between the ring gear and the vehicle frame.

5. The apparatus as claimed in claim 4 wherein the retarding means comprises a friction band adapted to surround a substantial portion of the ring gear, and the peripheral surface of the ring gear having a configuration to match the interior surface of the brake band.

6. The apparatus as claimed in claim 4 wherein the retarding means comprises a hydraulic pump, said pump having an external shaft upon which a gear is affixed, and the ring gear having external teeth adapted to be engaged by said gear which is affixed to the pumpshaft.

7. The apparatus as claimed in claim 6 and further including at least two hand control means, one of which operates through a variable pressure regulating valve.

8. A multi-speed bicycle transmission of the planetary gear type which is adapted to be mounted exteriorly of a wheel hub, comprising:
    a. a single sun gear adapted to be mounted concentrically with the bicycle's rear axle, said sun gear having a bore for accommodating the axle and a bearing therefor, and said sun gear having means for driving engagement with the rear wheel;

b. a pinion carrier adapted to be driven by a pedal crank, and said carrier having at least one stub axle upon which is mounted a pinion gear that engages the sun gear at all times, and there being a cover plate rigidly fixed to the carrier for rotation therewith, with the pinion gear being retained between the carrier and the cover plate;

c. an internally toothed ring gear mounted for continuous engagement with all of the pinion gears, and said ring gear being physically supported by the combination of the pinion carrier, the pinion gear and the cover plate, whereby the periphery of the ring gear is unobstructed;

d. a bracket adapted to be rigidly affixed to the bicycle frame adjacent the ring gear;

e. means for controllably affecting the permitted rotation of the ring gear with respect to the bracket, such that the rotation of the sun gear when the pinion carrier is driven is a function of the permitted rotation of the ring gear, with said means including structure engaging the periphery of the ring gear; and f. hand-operable means adapted to be affixed to the bicycle frame and having a functional connection with said means for affecting rotation of the ring gear.

9. The transmission as claimed in claim 8 wherein the hand-operable means includes a lever arm movable from a first terminal position in which the ring gear is permitted nearly free rotation with respect to the bracket to a second terminal position in which the ring gear cannot rotate with respect to the bracket, and there are an infinite number of intermediate positions between the first and second terminal positions.

10. The bicycle transmission as claimed in claim 8 wherein the means for affecting rotation of the ring gear comprises an elongated brake band mounted around the periphery of the ring gear, with the brake band having one anchored end and one floating end, and wherein the hand-operable means is connected to the floating end of the brake band through a cable.

11. The bicycle transmission as claimed in claim 8 wherein the means for affecting rotation of the ring gear comprises a closed hydraulic loop including a positive displacement pump with an external shaft, which shaft is adapted to rotate in direct proportion to the ring gear, and wherein the hand-operable means is connected to a flow restrictor in said hydraulic loop, whereby controlling the amount of liquid circulated through the hydraulic loop will affect rotation of the external shaft, which will in turn affect rotation of the ring gear as well as the sun gear when torque is applied to the pinion carrier.

12. In a pedal-operated vehicle including a frame, at least two supporting wheels, and a driven wheel hub, a variable ratio drive system comprising:

a. a planetary gear set mounted adjacent the driven wheel hub and externally thereof, with said set including a sun gear, a ring gear, and at least one planet gear rotatably mounted in a carrier, with the sun gear being engageable with the wheel hub for driving the same;

b. a foot-operated crank drivingly connected to the planetary carrier, whereby torque generated by the crank is transferable to the planetary carrier;

c. rotation controllling means located externally of the ring gear and fixed to the frame for affecting the rotation which the ring gear is permitted to have as the planetary carrier is turned, with said means providing a multiplicity of increments of drag on said ring gear;

d. a hand-operable control unit connected to the rotation controlling means fpr adjusting the effectiveness of said means, whereby the speed of rotation of the sun gear is a function of the rotation which the ring gear is permitted to have.

13. The variable ratio drive system as claimed in claim 12 wherein the hand-operable control unit is movable to essentially an infinite number of intermediate positions between two extreme operating positions, whereby there are essentially an infinite number of drive ratios obtainable between the foot-operated crank and the driven wheel hub.

14. The variable ratio drive system as claimed in claim 12 wherein the ring gear has a smooth external surface and the rotation controlling means constitutes a braking means adapted to selectively bear against said smooth external surface.

15. The variable ratio drive system as claimed in claim 14 wherein the braking means constitutes a brake band encompassing nearly 360° which bears against a peripheral surface on the ring gear.

16. The variable ratio drive system as claimed in claim 12 wherein the ring gear has exterior peripheral teeth, and the rotation controlling means includes a hydraulic pump which is keyed to a gear engaged with the exterior teeth of said ring gear, whereby slowing the operation of the pump can slow the rotation of the ring gear.

17. The variable ratio drive system as claimed in claim 16 wherein the hydraulic pump is a positive deplacement pump, and the hand-operable control unit is connected to a flow modulating valve in the discharge line from said pump.

18. The variable ratio drive system as claimed in claim 12 wherein the available drive ratios through the planetary gear set cover the range from about 0.5:1 to about 4:1, and the hand-operable control unit is incrementally adjustable to select any of the available drive ratios.

19. The variable ratio drive system as claimed in claim 12 and further including a ratchet mechanism for bearing against the ring gear to prevent reverse rotation thereof if the crank should be turned backwards.

20. The variable ratio drive system as claimed in claim 12 and further including a flapper adapted to bear against the ring gear for generating noise upon rotation of the ring gear, whereby the vehicle operator may sense through an audible signal whether or not the ring gear is rotating with respect to the frame.

21. The variable ratio drive system as claimed in claim 12 and further including a pawl mounted on the planet carrier and biased to permit forward rotation of the ring gear with respect to the carrier and to prevent reverse rotation thereof.

22. The variable ratio drive system as claimed in claim 12 and further including a coaster brake within the wheel hub and means for actuating same to impede movement of the vehicle upon reverse movement of the foot-operated crank.

23. The variable ratio drive system as claimed in claim 12 wherein the foot-operated crank is rigidly affixed to a front sprocket, which in turn is connected to a rear sprocket by a chain, and wherein the planetary carrier and the rear sprocket constitute an integral disk.

24. In combination with a bicycle having a frame, a front and rear wheel, and a pedal-driven crank, a variable ratio transmission, comprising:
   a. a planetary gear set contained within a housing adjacent the rear wheel, and the set including a single sun gear adapted to drivingly engage the rear wheel hub, a ring gear having internal teeth, and at least two pinion gears which engage the sun and ring gears at all times, with the pinion gears being rotatably mounted on stub axles fixed to a carrier;
   b. front and rear sprockets connected by a chain, with the front sprocket being fixed to the pedal-driven crank and the rear sprocket being fixed to the pinion carrier;
   c. a hub upon which the planetary gear housing is rotatably mounted about the rear wheel axle, with said hub being counterbored for receiving one of the two axle bearings;
   d. a coaster brake contained within the rear wheel hub and adapted to be actuated upon reverse rotation of the sun gear;
   e. means for selectively retarding the rotation of the ring gear as torque is applied to the pinion carrier, such that the rotational speed of the sun gear is affected in accordance with the amount of drag imparted to the ring gear; and
   f. hand-operable control means mounted on the frame and being funtionally connected with said means for retarding rotation of the ring gear in such a way as to permit selection of any of a plurality of drive ratios between the pedal-driven crank and the driven wheel.

25. The variable ratio transmission as claimed in claim 24 wherein the means for retarding rotation of the ring gear constitutes an essentially mechanical system, comprising:
   a. a bracket mounted on the frame adjacent the rear wheel;
   b. a brake band adapted to surround the peripheral surface of the ring gear, with one end of the band being anchored and the other end being pinned to a lever arm which is pivotally mounted on said bracket;
   c. a spring for biasing the lever arm such that the brake band is expanded with respect to the ring gear, whereby the ring gear is permitted essentially unrestrained rotation; and
   d. a cable connected at one end to the lever arm for pulling on the arm in opposition to the spring and thereby contracting the brake band around the ring gear for retarding the same, and the cable being connected at its other end to the hand-operable control means.

26. The variable ratio transmission as claimed in claim 24 wherein the means for retarding rotation of the ring gear constitutes an essentially hydraulic system, comprising:
   a. a positive displacement hydraulic pump mounted on the bicycle frame, with said pump being included in a closed hydraulic loop, whereby the pump may circulate a liquid through the loop;
   b. a positive friction element engaged with the exterior peripheral surface of the ring gear, and said positive friction element being also engaged with a rotary element on said pump, whereby slowing rotation of said rotary element will in turn slow rotation of the positive friction element;
   c. a valve in the hydraulic loop for controlling the circulation of liquid in the loop; and
   d. a cable connected at one end to the valve for adjusting the opening of the same, and being connected at its other end to the hand-operable control means.

27. The variable ratio transmission as claimed in claim 26 wherein the valve is an on/off flow control valve which can be modulated.

28. The variable ratio transmission as claimed in claim 26 wherein the valve is a pressure regulating valve.

29. The variable ratio transmission as claimed in claim 26 wherein at least a portion of the hydraulic loop between the pump outlet and the pump inlet includes two parallel legs, and there is included in one of the legs an on/off flow control valve and in the other leg there is included a pressure regulating valve.

30. The variable ratio transmission as claimed in claim 26 and further including a check valve in the hydraulic loop for permitting only one-way operation of the pump, thereby permitting only forward rotation of the ring gear.

31. The variable ratio transmission as claimed in claim 26 and further including a reservoir inserted into the hydraulic loop, and the reservoir having external cooling fins for fostering the transfer of heat from the hydraulic fluid to the ambient air.

32. A multi-speed bicycle transmission of the planetary gear type which is adapted to be mounted adjacent the pedal cranks, comprising:
   a. a single sun gear adapted to be mounted concentrically with the shaft that connects the bicycle's two pedal cranks, said sun gear extending beyond the pedal crank hub for a sufficient distance to be drivingly engaged by a pinion gear, and said sun gear being rigidly connected to a front sprocket which is adapted to drive a chain that extends over a rear sprocket connected to a rear wheel;
   b. a pinion carrier mounted between the two pedal cranks and rigidly fixed to the same, and said carrier having at least one stub axle upon which is mounted a pinion gear that engages the sun gear at all times;
   c. an internally toothed ring gear mounted for continuous engagement with all of the pinion gears;
   d. a bracket adapted to be rigidly affixed to the bicycle frame adjacent the ring gear;
   e. means for controllably affecting the permitted rotation of the ring gear with respect to the bracket, such that the rotation of the sun gear when the pinion carrier is driven is a function of the permitted rotation of the ring gear, with said means being adapted to provide a plurality of different rotational speeds of said ring gear by virtue of imposing a plurality of different drag loads on the periphery of the ring gear; and
   f. hand-operable means adapted to be affixed to the bicycle frame and having a functional connection with said means for affecting rotation of the ring gear.

33. The transmission as claimed in claim 32 wherein the hand-operable means includes a lever arm movable from a first terminal position in which the ring gear is permitted nearly unobstructed slippage with respect to the bracket, to a second terminal position in which the ring gear is locked to the bracket, and there are essentially an infinite number of intermediate positions between said first and second terminal positions.

* * * * *